UNITED STATES PATENT OFFICE.

GEORG KLENK, OF HAMBURG, GERMANY.

PROCESS OF MAKING DECOLORIZED TANNIN EXTRACTS.

SPECIFICATION forming part of Letters Patent No. 720,157, dated February 10, 1903.

Application filed June 16, 1902. Serial No. 111,990. (No specimens.)

*To all whom it may concern:*

Be it known that I, GEORG KLENK, doctor of philosophy, a subject of the German Emperor, residing at Hamburg, Germany, (and whose post-office address is Billhornerkanalstrasse, Hamburg, Germany,) have invented certain new and useful Improvements in the Manufacture of Tannin Extracts, (for which I have applied for a patent in Germany on November 25, 1901,) of which the following is a specification.

The present invention chiefly consists in treating the crude tannin extracts or tannin solutions at boiling temperature with alumina sulfate, and subsequently with sodium bisulfite. During this treatment the alumina sulfate has at first an intense decolorizing effect, after which it interacts with the bisulfite in the manner represented by the following equation:

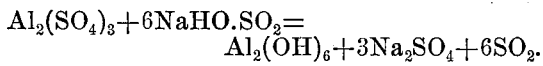
$$Al_2(SO_4)_3 + 6NaHO.SO_2 = Al_2(OH)_6 + 3Na_2SO_4 + 6SO_2.$$

The alumina hydrate in a nascent state produced in this manner attracts the separated particles held in suspension and falls to the bottom, thereby clarifying and decolorizing the liquid. The sulfurous acid also obtained in a nascent state has a decolorizing effect and escapes almost completely during the concentration or boiling down of the liquor. The complete separation of the alumina out of the liquid is absolutely necessary, because otherwise extracts would be obtained which are decolorized, but which lack the easy and clear solubility in cold water, which are necessary. For completely separating the alumina a slight excess of bisulfite is required, which renders the extract limpid and easily soluble. Extracts produced in this manner are soluble in cold water. They possess and retain a decidedly-acid reaction and impart to the leather a fine light yellow color, differing but slightly or not all from that which is produced by oak tanning.

The addition of organic acids, such as lactic and acetic acid, and even of mineral acids, such as sulfuric acid, to the liquid extracts or solution of extracts will not produce any precipitate. Consequently there is no danger that in commercial working precipitates will be produced by the acid tanning liquors. Moreover, the color which these extracts impart to the leather is permanent—not liable to change under the ordinary influence of the atmosphere.

In the commercial application of the process I proceed as follows: To the hot tannin extracts coming from the extractors I add a solution of alumina sulfate in a vat provided with an agitator, the quantity of the alumina sulfate to be employed depending on the strength of the tannin liquor, and the two liquids are thoroughly mixed by means of the agitator, whereby the liquor is decolorized, after which the required quantity of sodium bisulfite is added while constantly stirring. Subsequently the liquid is drawn off into a clearing-vat, where the alumina hydrate, which has been separated out, settles at the bottom, together with any solid impurities suspended in the liquid mixture. It is advantageous to cool the liquor to a temperature of 20° to 25° centigrade before drawing it off into the clearing-vat, whereby the extract gains in solubility and clearness.

A tannin liquor of 4° Baumé requires for five thousand liters of the liquor about four kilograms of solid alumina sulfate and fifteen to twenty kilograms of sodium bisulfite of 38° to 40° Baumé.

Quebracho extracts made from tannin liquors clarified and decolorized in the manner described above contain when at 25° Baumé from forty-five to forty-six per cent. of tannin.

It is evident that instead of alumina sulfate alum may be employed and instead of sodium bisulfite sodium sulfite and sodium hydrate, provided that the necessary precautions are observed.

The above process is suitable for the production of the following extracts soluble in cold water, viz: extracts of quebracho, mimosa, hemlock, sumac, firs, oak, chestnuts, and others.

What I claim is—

1. The process for the manufacture of decolorized tannin extracts soluble in cold water, which consists in first treating the crude tannin solution with alumina sulfate and subsequently with sodium bisulfite, substantially as described.

2. The process for the manufacture of tannin extracts soluble in cold water, which consists in adding to the hot crude tannin extracts a solution of alumina sulfate, thoroughly mixing the two liquids and subsequently adding sodium bisulfite, while constantly stirring, and drawing off the liquid, substantially as described.

3. The process for the manufacture of tannin extract soluble in cold water, which consists in adding to the hot crude tannin extract a solution of alumina sulfate, thoroughly mixing the two liquids, subsequently adding sodium bisulfite, while constantly stirring, then allowing the liquid mixture to cool to a temperature between 20° and 25° centigrade, then drawing off and allowing it to settle, substantially as described.

4. The process for the manufacture of tannin extract soluble in cold water from a crude tannin solution of 4° Baumé, which consists in thoroughly mixing the hot crude solution with alumina sulfate in the proportion of five thousand liters of the former to about four kilograms of solid alumina sulfate, in order to procure discoloration, then adding to the mixture sodium bisulfite, while constantly stirring in the proportion of fifteen to twenty kilograms of bisulfite solution of 38° to 40° Baumé to the above quantity of extract, drawing off the resulting liquid and allowing it to settle, substantially as described.

In witness whereof I have hereunto signed my name in the presence of two subscribing witnesses.

GEORG KLENK.

Witnesses:
HERMAN REIMER,
CLAUS RAMPMANN.